United States Patent [19]
Fay

[11] Patent Number: 5,714,761
[45] Date of Patent: Feb. 3, 1998

[54] SCINTILLATOR APPARATUS

[75] Inventor: Theodore D. Fay, Mission Viejo, Calif.

[73] Assignee: PHI Applied Physical Sciences, Mission Viejo, Calif.

[21] Appl. No.: 640,622

[22] Filed: May 1, 1996

[51] Int. Cl.$^6$ ........................................... G01T 1/20
[52] U.S. Cl. ..................... 250/367; 250/368; 250/486.1; 250/488.1
[58] Field of Search ...................... 250/366, 367, 250/368, 369, 486.1, 487.1, 488.1

[56] References Cited

U.S. PATENT DOCUMENTS

| | | |
|---|---|---|
| 4,267,446 | 5/1981 | Brown et al. ............ 250/367 X |
| 5,317,158 | 5/1994 | McElhaney et al. ............ 250/367 |
| 5,506,408 | 4/1996 | Vickers et al. ............ 250/368 X |

*Primary Examiner*—Edward J. Glick
*Attorney, Agent, or Firm*—Walter A. Hackler

[57] ABSTRACT

A scintillator detector apparatus includes a sandwich of fibers disposed in a spaced apart pattern for detecting one form of radiation while enabling another form of radiation to pass through open portions between the fibers along with a thin film attached to or proximate to the fibers for detecting the another form of radiation. The thin film is disposed on a plastic substrate which includes a reflecting layer for directed scintillation from the film into the fibers. The fibers scintillate upon interception of, for example, beta particles, which is transmitted to photomultiplier apparatus by the fibers. The fibers are also sensitive to ultraviolet scintillation from the film and it responds thereto to generate scintillation which is also transmitted to the photomultiplier tube. Combinations of the sandwiches may be utilized to formulate time of flight scintillation detectors and the sandwich can be responsive to various types of radiation dependent upon selected fibers and thin films.

28 Claims, 10 Drawing Sheets

SCINTILLATOR APPARATUS

The present invention is generally directed to scintillator apparatus and is more particularly directed to thin and fast scintillators capable of simultaneously detecting a plurality of different radiation/particle types with commercial applications.

Scintillation occurs when high energy particles or photons pass through a crystal. The particles lose energy in traveling through the crystal by transfer of energy to the atomic electrons. In turn, the excited atoms and excitons decay with accompanying bursts of multiple photons of UV or visible light. Solid crystalline substances have a high electron density in which particles and gamma rays have a relatively short range. Accordingly high efficiency for the detection of high energy particles and photons is accordingly obtained in the relatively small volume or thickness. When used in combination with a photomultiplier, crystal scintillator provide an output signal with relatively good energy resolution.

Unfortunately, the response time of known scintillating materials is not fast enough to provide for particle detectors which can generate simultaneous data on the types and masses of particles along with particle energy and direction. That is, currently no bright (>10 protons/Kev) scintillator crystals are available with nanosecond response times. While there is a current need for such fast response time crystals the current development of such scintillators takes years and is very costly, for example, more than one million dollars for each new crystal produced.

The low Z values of plastic scintillators produce high attenuation lengths. Thus, the fast plastic scintillators commercially available yield inaccurate position measurements, especially for electrons and x-rays. In addition, these scintillators cannot easily separate different particle types, i.e., protons, alphas, betas and mesons.

Current fast inorganic scintillators, $BaF_2$ and $CaF_2$, do not have a bright component with sufficiently fast nanosecond decay times to enable the most accurate time of flight measurements. The present invention is directed to a particle detector utilizing scintillators which are thin (thus able to be sensitive to the direction of an incoming particle), bright (>10 photon/KeV) and fast enough to provide time of flight data.

SUMMARY OF THE INVENTION

Scintillator detector apparatus in accordance with the present invention generally includes fibers disposed in open grid pattern which provides a means for detecting one form of radiation while enabling another form of radiation to pass through open portions of the grid pattern. In combination with a thin film, it provides a means for detecting another form of radiation with the film being deposited on a plastic substrate disposed proximate to the fibers on one side thereof. This scintillator "sandwich" in combination with proper electronics can be used for simultaneous time of flight and position measurements of different forms of radiation or particles.

In one embodiment, the present invention may comprise individual fibers disposed in a crossed pattern. In another embodiment of the present invention the fiber means may comprise individual fibers disposed in a parallel relationship with one another. Either of these embodiments provide open areas of between fibers to enable another form of radiation to pass through.

More particularly, in accordance with the present invention the thin film may comprise scintillating material means for emitting scintillation upon the interception of another form of radiation and further reflecting layer means may be disposed on the plastic substrate for directing the scintillation from the thin film means into the fiber means.

Still more particularly, the apparatus in accordance with the present invention may comprise individual fibers having a thickness enabling beta particles of selected energy to pass through the plastic substrate and deposited film. The film has a thickness enabling alpha particles of a selected energy to pass through the film.

In addition, an aluminized plastic film may be disposed approximate either side of the fiber means which provides an additional means for directing the scintillation from the thin film means into the fiber means. The scintillation generated by alpha particles in the thin film means is in the form of ultraviolet light and the UV light is operative for generating scintillation in the fibers. Upon interception of beta particles, the ultraviolet light is generated directly by the thin fiber means. A frame may be provided for supporting the plastic film substrate and adhesive means may be provided for gluing the individual fibers onto the plastic substrate.

Additionally, photomultiplier means, connected to the individual fibers, may be provided for receiving the scintillation generated by the fiber means.

In one embodiment, the present invention of the apparatus may include a composite scintillator "sandwich" means for generating particle discrimination. For example, alpha particles can only pass through the thin film means and thus only in between the individual fibers, while beta particles can pass directly through the individual fiber means. A second scintillation means has sufficient thickness to stop both the alpha and beta particles and a second multiplier means is provided for receiving a scintillation generated by the second scintillator means. The spaced apart relationship between the second scintillation means and the scintillation "sandwich" enables time of flight, position and direction measurements. In this manner, the device discriminates between two forms of particle radiation, namely the alpha and beta particles.

In another embodiment of the present invention, first thin film means are provided for generating ultraviolet light upon the interception of alpha particles with a first thin film means being deposited on the first plastic substrate. A first frame provides a means for supporting the first plastic substrate.

First fiber means is provided which has individual fibers disposed on the first plastic substrate in an open grid pattern for detecting beta particles and ultraviolet light striking an individual fiber. The open grid pattern enables alpha particles to pass between the individual fibers.

Second thin film means is provided for generating ultraviolet light upon interception of alpha particles with the second thin film means being deposited on a second plastic substrate.

A second frame means is provided and disposed in a spaced apart relationship of the first frame means for supporting the second plastic substrate.

A second fiber means having individual fibers is disposed on the second plastic substrate in an open grid pattern is provided for detecting beta particles and ultraviolet light striking an individual fiber and for enabling alpha particles to pass between the individual fibers.

More particularly in this embodiment, the first plastic substrate may comprise reflecting layer means for directing ultraviolet light generated by the first thin film means into the first fiber means with the first plastic substrate being disposed proximate one side of the first fiber means and the second plastic substrate comprises reflecting layer means for directing ultraviolet light, generated by the second and film means, into the second fiber means with the second plastic substrate being disposed proximate one side of the second fiber means.

In this embodiment, the first fiber means includes individual fibers having a thickness enabling beta particles of the selected energy to pass therethrough and the second fiber means comprises individual fibers having a thickness preventing beta particles of the selected energy to pass therethrough. In addition, the first thin film means and first plastic substrate have a thickness enabling alpha particles of a selected energy to pass therethrough and the second thin film means and the second plastic substrate have a thickness preventing alpha particles of the selected energy to pass therethrough. Accordingly, in this embodiment, beta particles passing through the first fiber means initiate an electrical signal and also cause and electrical signal in the second fiber means when intercepted thereby. These two electrical signals provide the data necessary for determining the time of flight, direction and energy of the beta particles.

Similarly, the first film means provides a signal upon interception of an alpha particle and the second film means provides an electrical signal upon capture of the alpha particles and in combination the signals provide the data necessary for calculating time of flight and direction of alpha particles. Thus, the combination according to the present invention is able to detect multiple radiation, specifically, for example, alpha and beta particles, simultaneous with information as to energy and direction.

The electrical signals are provided by first photomultiplier means connected to the first fiber means which generate an electrical output corresponding to scintillation from the individual fibers generated by beta particles and ultra violet light and second photomultiplier means connected to the second fiber means for generating electrical outputs corresponding to scintillation of individual fibers generated by beta particles and ultraviolet light. The ultraviolet light corresponds to alpha particles passing through the first and second thin film means which is reflected into the first and second fiber means respectively.

Importantly, the first thin film means comprises a scintillating material having a scintillating generating/decay time faster than the time necessary for the alpha particles to traverse a distance between the first thin film means and the second thin film means.

Accordingly the present invention the scintillating thin film means may either comprise doped $BaCl_2$ or doped ZnO films. The $BaCl_2$ films may be doped with Ce or Si, and the ZnO films may be doped with $SiO_2$, $Ga_2O_3$ and H or O.

BRIEF DESCRIPTION OF THE DRAWINGS

The present invention can be more readily understood by consideration of the following detailed description, particularly in conjunction with the accompanying drawings in which.

DETAILED DESCRIPTION

Figure 1:
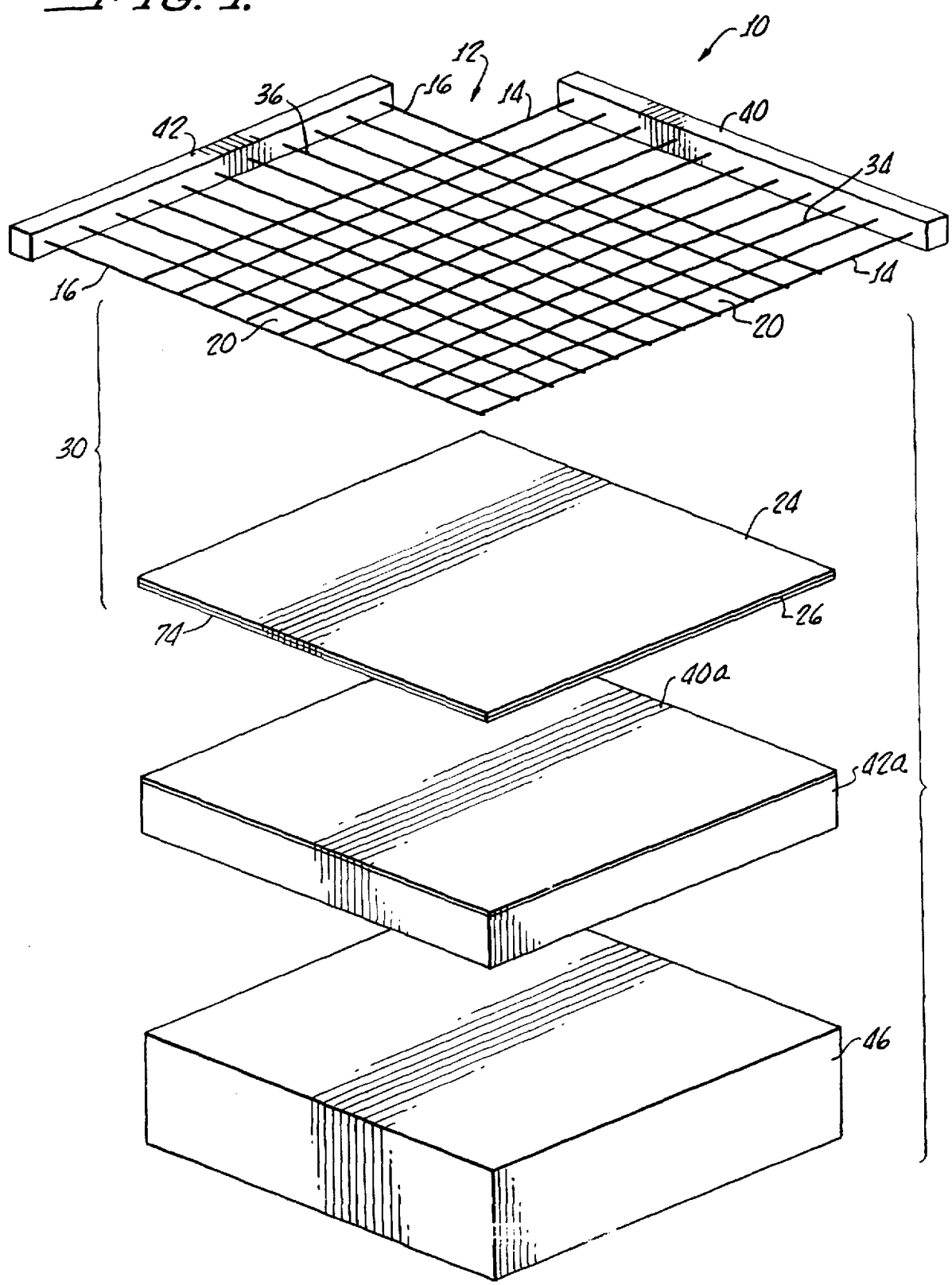
FIG. 1 is a perspective exploded drawing of one embodiment of the present invention.

Turning now to FIG. 1, there is shown, in diagrammatic format, scintillator detector apparatus 10 generally including fiber means 12 including individual fibers 14, 16 disposed in an open grid pattern with openings 20 therebetween. As hereinafter described in greater detail, the fibers 14, 16 are disposed and operative for detecting one form of radiation, for example, beta particles, while enabling another form of radiation, for example, alpha particles, to pass through the openings 20, or open portions, of the grid pattern.

In combination therewith a thin film 24 provides means for detecting another form of radiation, for example, alpha particles and the thin film means 24 is disposed on a plastic substrate 26 disposed proximate the fiber means 12. In combination, the fiber means 12 and thin film means 24 provide a scintillator "sandwich" 30 which provides many novel features including the ability to accurately measure energy of different kinds of particles using time of flight techniques as hereinafter described in greater detail.

As shown, the scintillator sandwich 30 comprises a grid of commercially available plastic fibers to detect beta particles overlaid with a micron thin film 24 scintillator to detect alphas. In addition, film materials and fibers 14, 16 and film 24 can be selected to effectively detect and measure a combination of soft x-ray, alpha, beta or proton radiation. It should be appreciated that while only a two layer sandwich is described herein in various embodiments in order to succinctly describe the present invention, the sandwich may include other grids of fibers (not shown) and thin films (not shown) in order to make the detector versatile and useful for a great number of applications. An ideal detector in accordance with the present invention would characterize and spatially locate all forms of radiation, including UV, x-rays, gamma rays, particles and neutrons, and would not deteriorate under harsh environmental conditions.

Suitable scintillating fibers 14 and 16 for detecting beta particles in accordance with the present invention are plastic DCF-10 square fibers available from Bicron, Inc. in Solon and Newbury Ohio, and each of these fibers 14, 16 may be about 2 mm square with a length of about 15 cm. Fibers 14, 16 may be disposed in a crossed pattern as shown in FIG. 1 with the openings, or spaces, 20 between fibers being about 5 mm in dimension to enable passage of alpha particles therethrough.

The 2 mm square fibers enable beta particles with an energy greater than about 0.4 MeV to penetrate the fibers utilizing a 10 fiber grid. The overall size of the crossed fiber pattern is about 10 cm×10 cm. This enables additional lengths 34, 36 of the fibers to be interconnected with commercially available photomultiplier tubes 40, 42 respectively, such as, for example, HAMAMATSU 4286 position sensitive photomultiplier tubes.

Beta particles (not shown in FIG. 1) passing through the fibers 14, 16 cause scintillation therein in the form of ultraviolet light which is optically conducted to the photomultiplier tubes 40, 42 by the fibers themselves.

As hereinafter described in greater detail in connection with the embodiments of the present invention, the fibers 14, 16 may be held in position by gluing the fibers 14, 16 to the plastic substrate 26 using an optical cement such as BCF-600 also available from Bicron, Inc.

The thin film 24 may have thickness of between about 1 micron and about 3 microns and be comprised of a scintillating material such as $BaCl_2$ or doped ZnO which will be hereinafter described in greater detail. The thin film may be disposed on a MYLAR® plastic substrate 26 having a thickness of between about 3 microns and about 30 microns. This enables alpha particles having an energy of between about 3 MeV and about 10 MeV to pass therethrough.

Alpha particles striking the fibers 14, 16 are trapped therein while alpha particles passing through the opening 20 in the fiber means 12 pass through the thin film 24 and substrate 26 and are subsequently captured by a thick scintillating film 40A (for example, about 30 microns) disposed on a plastic scintillator disk 42A which stops beta particles passing through the fibers 14, 16 and produces a scintillation corresponding thereto. The scintillation from the thick film 40A and disk 42A are received by a third photomultiplier 46.

Figure 2:
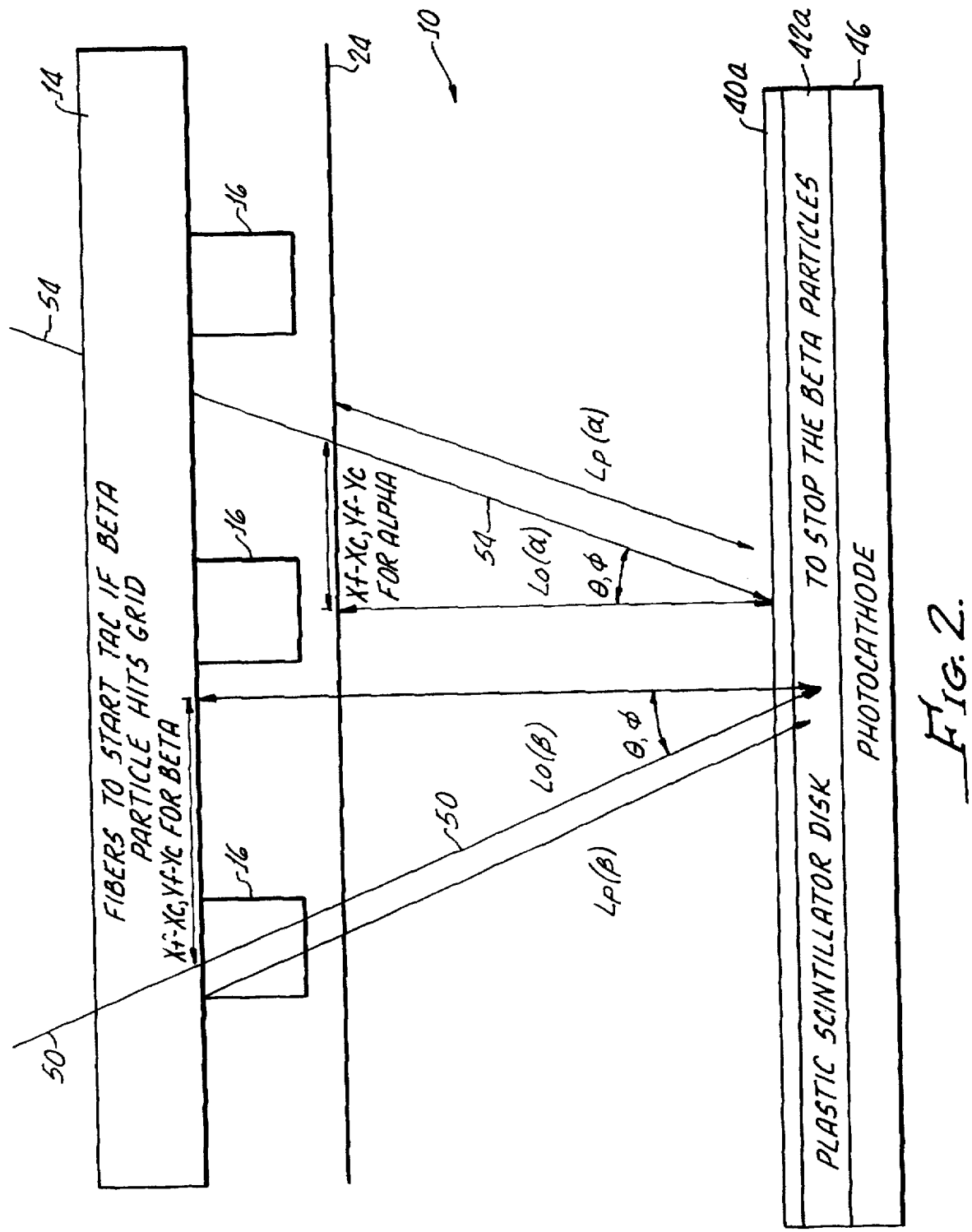
FIG. 2 is an illustration of the side view of the embodiment shown in FIG. 1.

As shown in FIG. 2, in operation, incoming beta particles 50 pass through a fiber 14, 16 and thereafter are intercepted and stopped by the plastic scintillator disk 42A. As hereinafter discussed, the scintillation from the fibers 14 and 16 and subsequent scintillation from the disk 42A may be used to determine both beta particle energy and direction travel as indicated by the tine 50 in Figure. Incoming alpha particles 54 passing between the fibers 14, 16 in the opening 20, intercept and pass through the thin film 24 which scintillates and through the photo- multiplier tubes 40, 42 initiates an initial time of flight measurement for the alpha particle. The thick film 40A stops the alpha particle and provides scintillation corresponding thereto which is received by the third photomultiplier 46, subsequent electrical output providing the necessary information determining alpha particle energy and position as indicated by the line 54 in FIG. 2.

The thick film 40A and scintillator disk 42A are disposed in a spaced apart relationship with the scintillator sandwich 30, for example, about 8 cm. As will be described hereinafter, the thin film means comprises a scintillator material having a scintillation generation/decay time faster than a time necessary for the alpha particle to transverse the distance between the thin, film means 24 and the thick film 40A. Thus, discrete electrical output signals are generated when the alpha particle passes through the thin film 24 and is stopped by the thick film 40A. Accordingly this fast response time enables time of flight measurements through the use of the scintillator apparatus shown in FIGS. 1 and 2.

Figure 3:
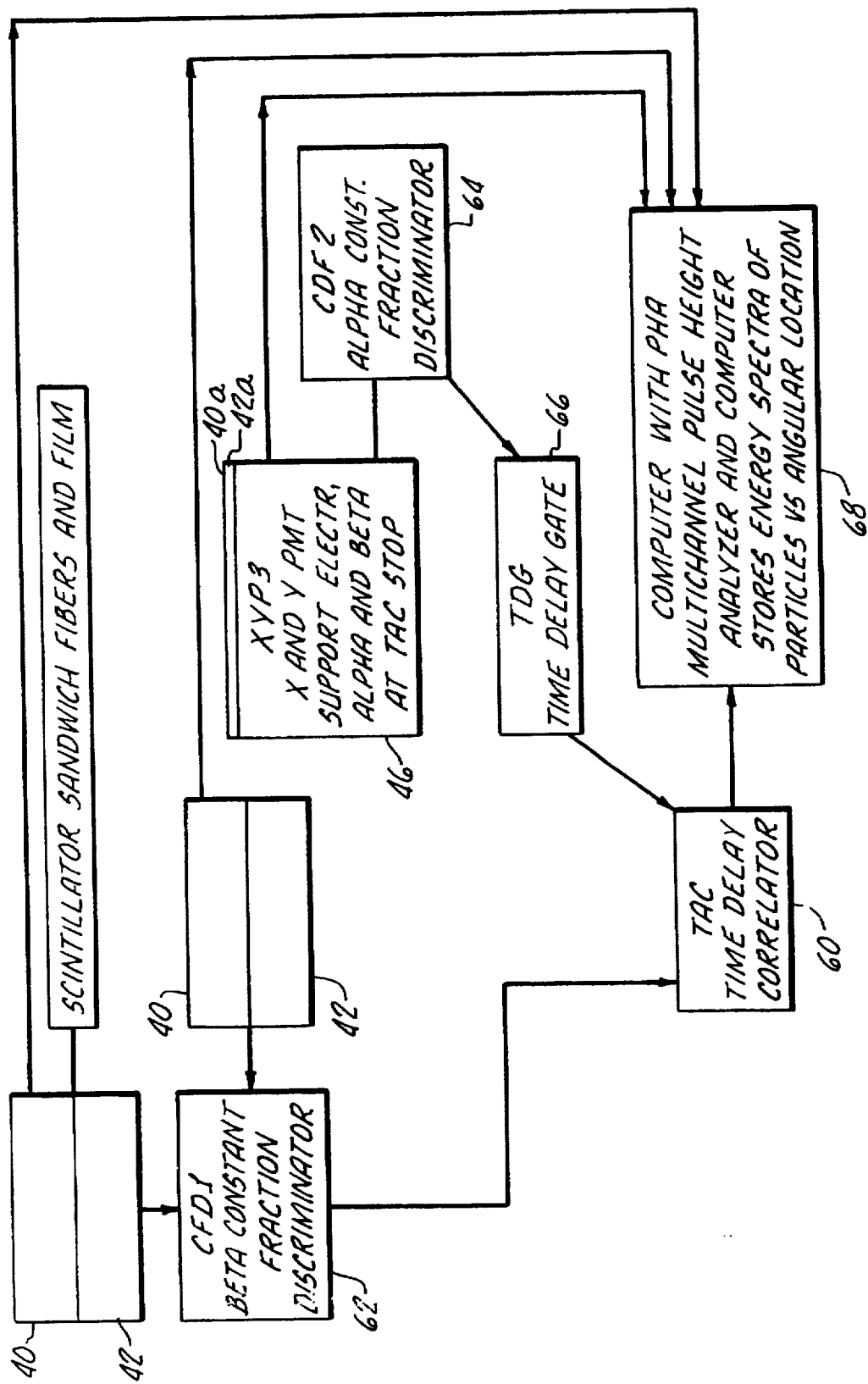
FIG. 3 is a block diagram of associated electronics which may be used with the embodiment shown in FIGS. 1 and 2.

FIG. 3 illustrates the support electronics for the detector apparatus 10. Generally, all of this support equipment is commercially available and accordingly is represented in diagram form in FIG. 3. In time of flight measurements, a time delay correlator is utilized to measure the time between beta particle striking the fibers 14, 16 and the spaced apart scintillator 42A.

The photomultipliers 40, 42 determine the x, y coordinates of the beta particle at the start of the time of flight measurement. This signal is sent to a time delay correlator 60. In view of the fact that alpha particles may also strike the fibers, a discriminator 62 is utilized to distinguish the beta particles from the alpha particles and transmit beta particle information only to the time delay coordinator.

Scintillation from the thin film in response to traverse by an alpha particle is in the ultraviolet range. This ultraviolet energy is intercepted by the fibers 14, 16 which produces additional scintillation also transmitted received by the photomultiplier 40, 42. Electrical output corresponding to alpha particles traversing the thin film 24 is also imputed to the constant fraction discriminator 62 and thereafter to the time delay correlator 60. This results in separate start signals for each of the beta and the alpha particles as they traverse the fibers 14, 16 and thin film 24 respectively.

The alpha and beta particles are stopped respectively by the thick film 40A and the scintillator disk 42A and stimulation therefrom results in electrical output from the photomultiplier 46. In view of the two scintillation events associated with alpha and beta particles, the output is passed through an alpha constant fraction discriminator 64, a time gate 66 and thereafter to the time delay coordinator. In addition, output from the photomultiplier tube 40, 42 and 46 is fed to suitable computer 68 which utilizes the time delay correlator provides energy position data on the detected particles.

As hereinabove noted, the scintillating fibers 14, 16 are responsive not only to beta particles but to ultraviolet light emitted by the scintillating thin film 24.

In this manner a separate photomultiplier (not shown) is not required for providing electrical output corresponding to alpha particles traversing a thin film and causing the scintillation therein.

In order to enhance the coupling of the emitted UV radiation from the thin film due to scintillation a reflecting layer 74, which may be aluminum or the like, is provided for directing the UV scintillation from the thin film 24 into the fibers 14, 16.

Figure 4:
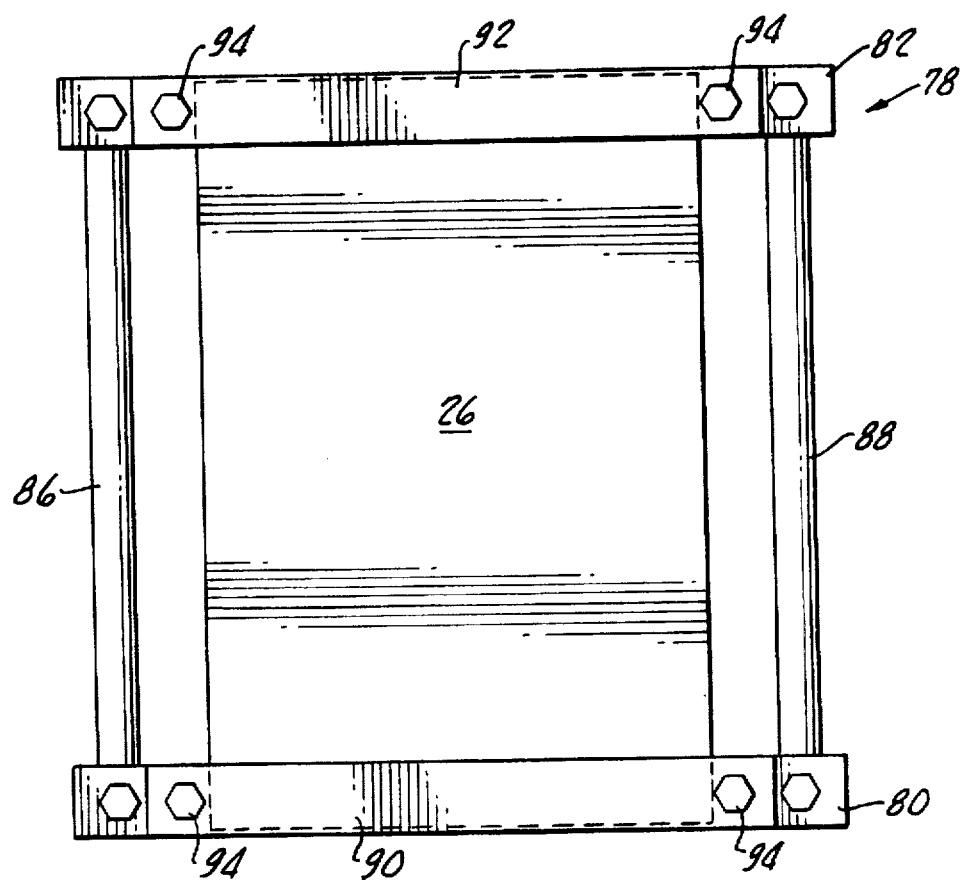
FIG. 4 is a top plan view of a frame suitable for supporting the scintillator sandwich shown in FIGS. 1–3.
Figure 5:
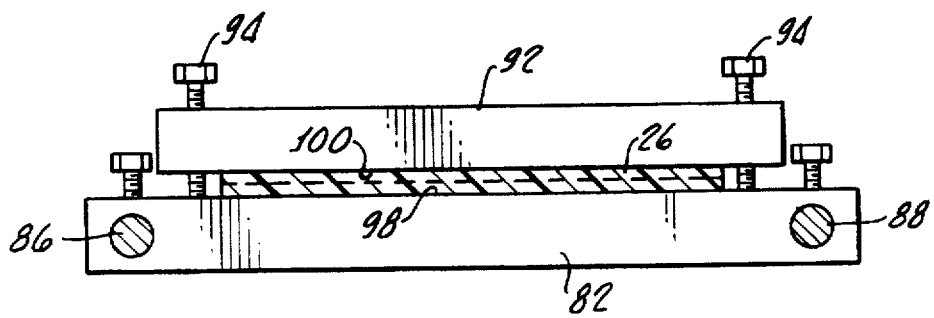
FIG. 5 is a side view of the frame, or holder, shown in FIG. 4.

As hereinabove noted, the fibers 14, 16 may be glued to the substrate 26, however, the substrate itself may be supported by a stainless steel frame 78 such as shown in FIGS. 4 and 5. Frame may include two bars 80, 82 held in a spaced apart relationship by rods 86, 88 a second set of bars 90, 92 clamping action is provided between the sets of bars 82, 90 and 80, 92 by ways of screws 94 passing through bars 90, 92 and threadibly engaging bars 80, 82 respectively. Interfaces 98, 100 of the bars 80, 82 and 90, 92 may be roughened in order to enhance gripping of the film 26 stretched therebetween.

Figure 6:
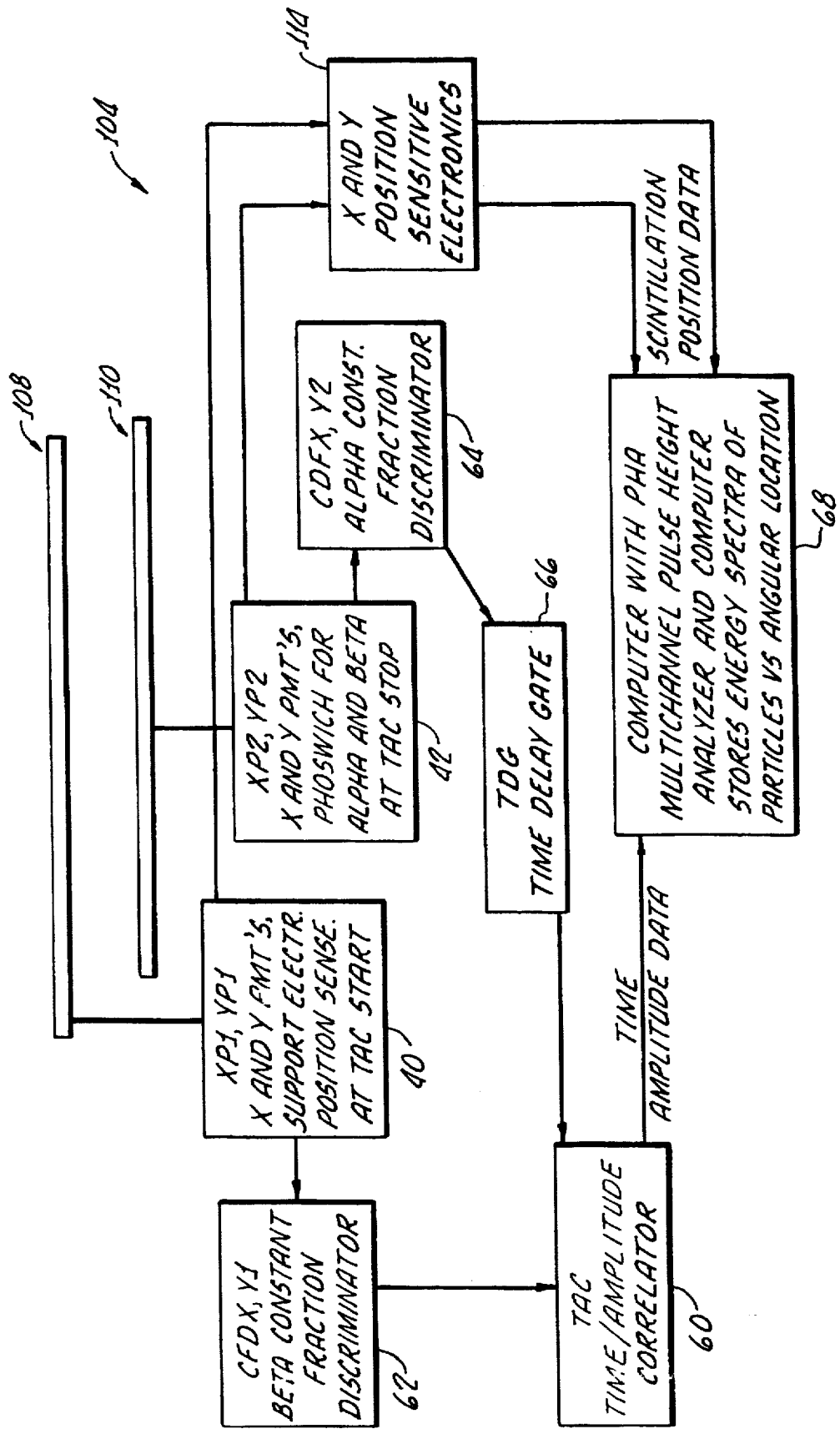
FIG. 6 is a block/schematic view of another embodiment of the present invention utilizing two scintillator sandwiches in accordance with the present invention.

Turning now to FIG. 6, there is representation of another embodiment 104 of the present invention utilizing two scintillator sandwiches 108 and 110. These scintillator sandwiches 108, 110 are equivalent to the sandwich 30 hereinabove described and utilization of the two sandwiches eliminates the need for the scintillator disk 42A and third photomultiplier 46 hereinabove described. Common numerical references to the electronic support equipment corresponds to similar electronic components hereinabove described in connection with FIG. 3.

Again the difference in time between the TAC 60 start and stop signals provides a time of flight data stream for each alpha and beta event. The fiber scintillators 14, 16 and the position sensitive photomultipliers 40, 42 in associated electronics 114 provide both position and brightness on the particle events so that the computer, with pulse height analyzer, 68 will automatically display the particle direction, energy, velocity and mass from equations shown in Table 1:

TABLE 1

Performance Equations for Particle Detector shown on FIG. 2 are as follows:

The fractional area covered by the BCF 10 fibers, $A_f$ is given by:
$A_f = f_d \times f_l \times N_f = 10 \text{ cm}^2$ $f_d = 0.2 \text{ cm}$ $f_l = 5 \text{ cm}$ $N_f = 10$.
The area of the holder, $A_h$, is $5 \text{ cm} \times 5 \text{ cm} = 25 \text{ cm}^2$.
The probability of a hit on one fiber is $A_f/A_h - 0.4$, and the probability of a miss on one fiber is $(A_h - A_f)/A_h = 0.6$.
These point design variables show for the FIG. 2 case that:
The probability that both fibers layers are hit by a beta particle is $A_f^2/A_h^2 = 0.16$.
The probability that an alpha particle misses both fiber layers is $(A_h - A_f)^2/A_h^2 = 0.36$.
Particle kinetic energy by time of flight is:
$T = (\gamma - 1)Mc^2$ here $\gamma^2 = 1/(1 - \beta^2)$ provided $\beta = v/c$.
In this equation M is the particle rest mass, v is the improper particle velocity and c is the velocity of photons in the vacuum.
The measurements for $L_p$ (see FIG. 7B) are derived directly from the PMT position sensitive measurement of $X_f$ and $Y_f$. These enable computation the particle's energy and location, since $L_p^2 = (X_f - X_c)^2 + (Y_f - Y_c)^2 + L_o^2$ and for kinetic energy, T, we have: $T = (\gamma - 1)Mc^2$
$\beta = L_p/c\, t_p$, therefore $\gamma^2 = (c\, t_p)^2/[(c\, t_p) - L_p^2]$
In this case the constants $X_c$, $Y_c$ and $L_o$ are determined during fabrication of the particle detector, and also measured, $t_p$, the travel time determined by the TAC 60 shown in FIG. 3.
The source angular coordinates, $\Theta$ and $\phi$, shown on FIG. 2 are given by:

$\text{Sec } \Theta = L_p/L_o \quad \text{Sin } \phi = (Y_f - Y_c) L_o \sqrt{(\text{Sec}^2 \Theta - 1)}$ $\text{Cos } \phi = (X_f - X_c) L_o \sqrt{(\text{Sec}^2 \Theta - 1)}$ where both the cos $\phi$ and the sin $\phi$ are needed to specify the quadrant of the source.

Figure 7:
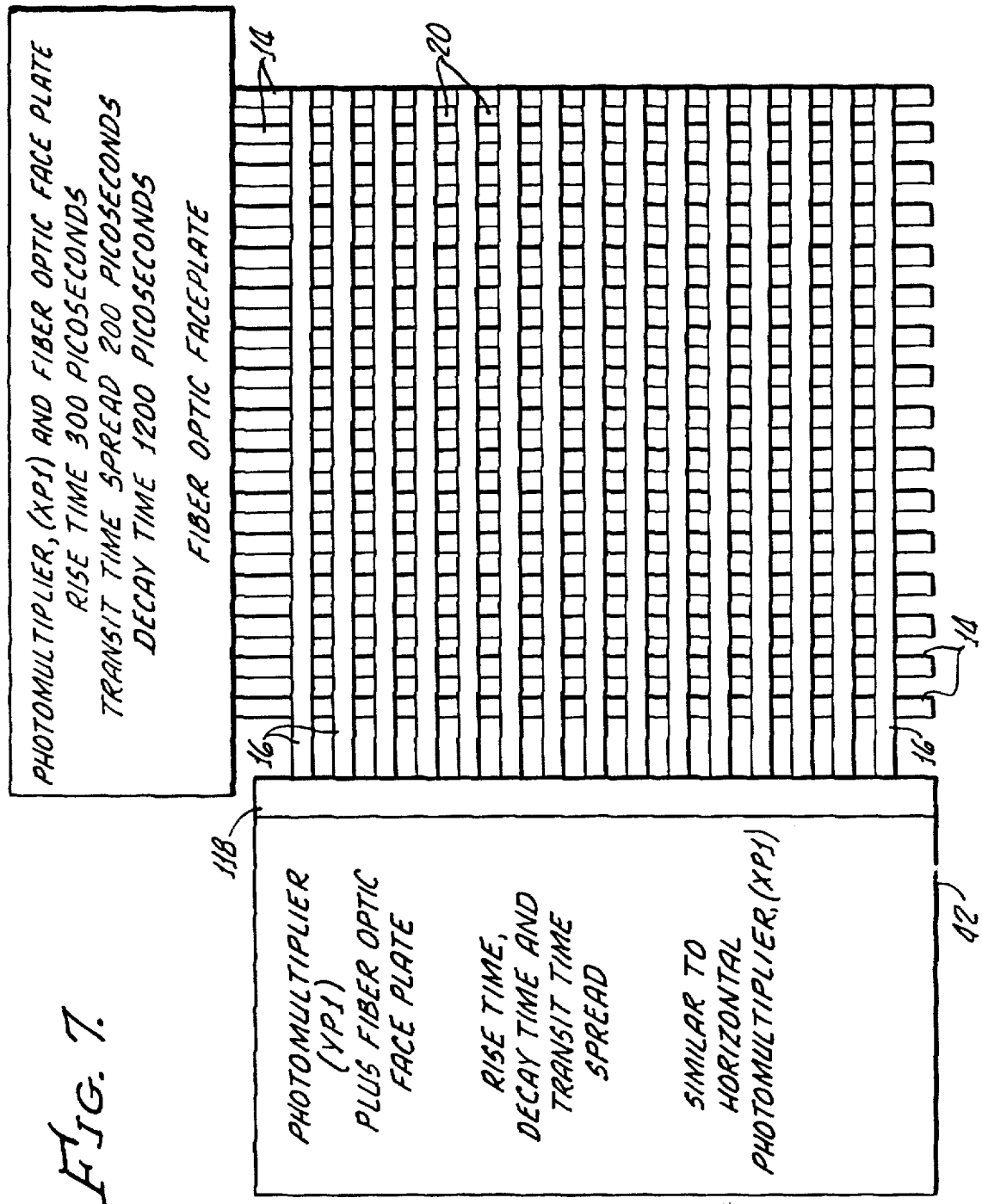
FIG. 7 is a top view of a scintillator sandwich in accordance with the present invention which may be used in the embodiment shown in FIG. 6.

FIG. 7 is a top view of the scintillator sandwich showing a crossed array of fibers 14, 16 interconnected with the photomultiplier tubes 40, 42. The photomultipliers are available from Hammatsu: Model Nos. H6564 & R5900U, having a rise time of about 300 picoseconds, a transient time spread of about 200 picoseconds and a decay time of about 1200 picoseconds. The coupling between the fibers 14, 16 and the photomultipliers 40, 42 may be made to optical face plates 116, 118 commercially available.

Figure 8:
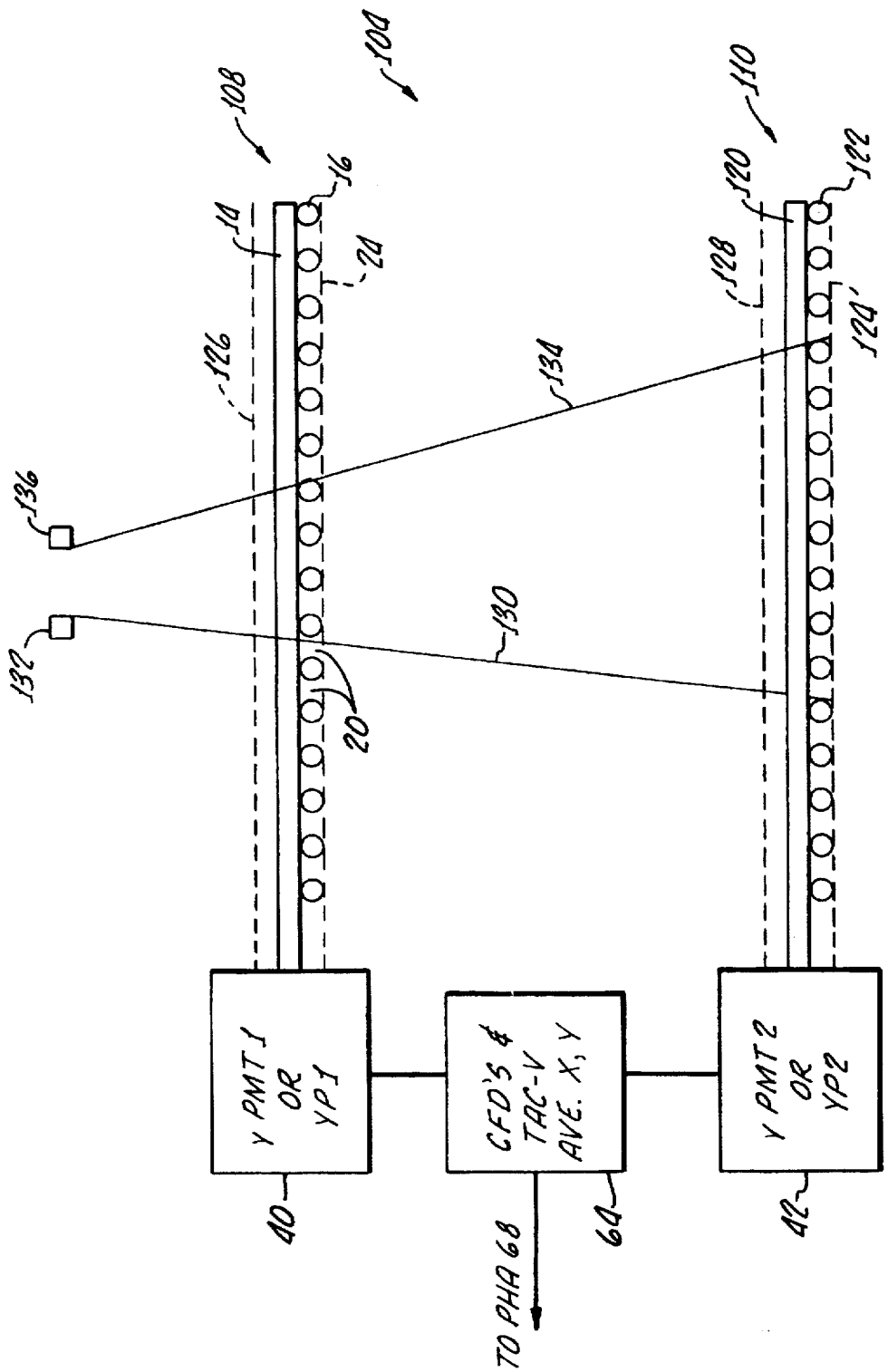
FIG. 8 is a side view representation of the embodiment as shown in FIGS. 6 and 7.

Turning now to FIG. 8, there is shown a side view representation of the embodiment 104 shown in FIGS. 6 and 7. The two scintillator sandwiches 108, 110 may be disposed approximately 10 cm from one another. The sandwich 110 similar to the sandwich 108 includes fibers 120, 122 and an aluminized film 124.

Figure 9:
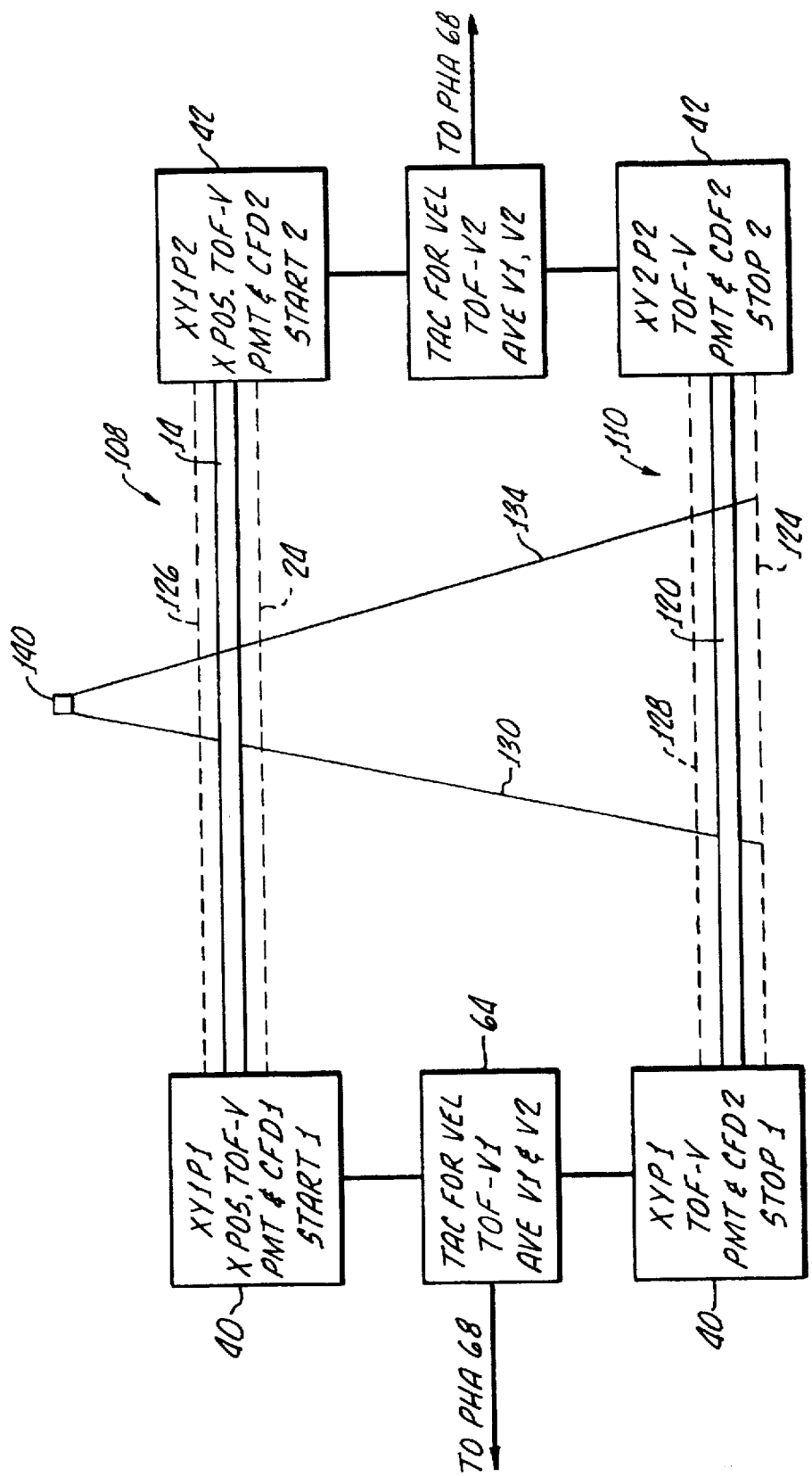
FIG. 9 is a side/block diagram view of the embodiment shown in FIG. 8.

Also provided to enhance the coupling of ultraviolet scintillation from the thin films 24, 124 into the fibers 14, 16 and 122, 124 respectively are aluminized plastic films 126, 128 which provides a means for directing ultraviolet scintillation from the thin film means 24, 124 into the fibers 14, 16 and 120, 122 respectively. As shown in FIG. 8 alpha particles 130 from a source 132 pass between the fibers 14, 16 in openings 20 therebetween and are intercepted by the fibers 120, 122 or the film 24. On the other hand beta particles 134 from a beta source 136 intersect one or more of the fibers 14, 16 and the fibers 120, 122. A side view of the embodiment shown in FIG. 8 is shown in FIG. 9 showing detection of alpha particles 130 and beta particles 134 from a common source 140.

Figure 10:
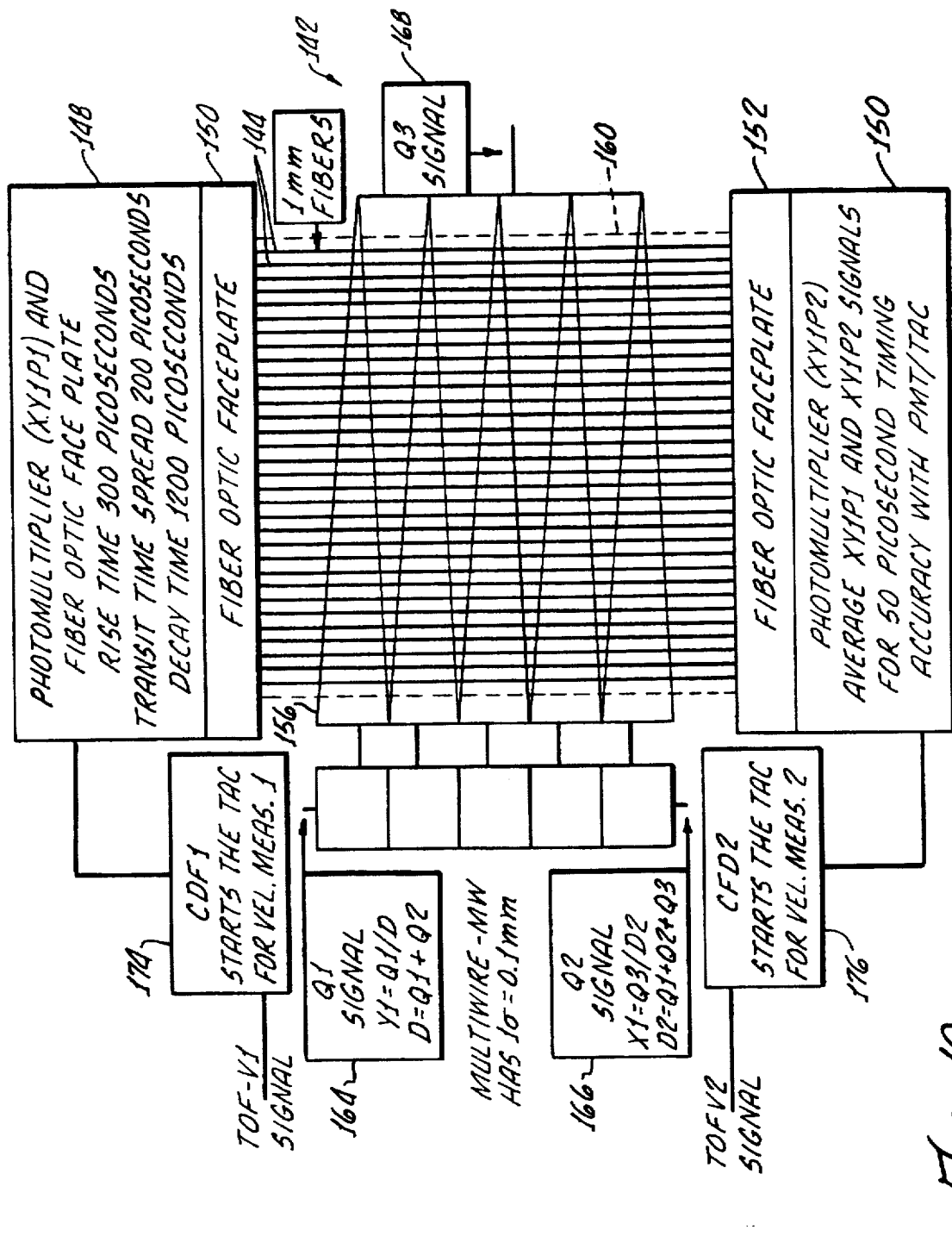
FIG. 10 is the plan view of another embodiment of the present invention utilizing the parallel array of fibers.

Another embodiment of the present invention is shown in FIG. 10 in which fibers 144 are disposed in a parallel manner between photomultiplier tubes 148, 150 and optical face plates 150, 152 respectively. The fibers 144 as well as the photomultipliers 148, 150 and optical face plates 150, 152 are identical to those hereinabove discussed in connection with embodiments 10 and 104 of the present invention.

The embodiment 142 incorporates a well known multi-wire counter apparatus designated as lines 156 in FIG. 10. This embodiment has the advantage in that almost 50% of alpha particles will pass the fibers 144 as opposed to the crossed wire embodiments 10, 104 as shown in FIGS. 2 and 8. The multi-wire counter 156 measures X, Y particle positions at two time of light locations to 0.1 mm, well fast fiber 146 and film scintillator 160 measure the time of light to 50 picoseconds accuracy.

The multi-wires 156 produce three signals indicated at boxes 164, 166, 168. These signals are sent to constant fraction discriminators 174, 176 for starting the time of flight correlator 60, not shown in FIG. 10. This arrangement results in the simpler one dimensional fiber optics design but has somewhat more complicated electronics. A full explanation of the multi-wire electronics and figuration is set forth in "Application Of The MBWC Two-Dimensional Positional Readout Techniques to a Multi-wire Proportional Counter", Mizogawa, M. Sato and Y.Awaya, "Nuclear Instrumentation and Methods in Physics Research" A366, 129, 1995. This article is incorporated herewith in toto for providing a description of electronics suitable for the apparatus of the present invention.

The scintillator apparatus in accordance with the present invention requires heavy inorganic thin films in order to make accurate time of flight measurements. These heavy inorganic scintillators must be both bright and have nanosecond decay speeds.

Proper materials can be chosen through the use of theoretical description of excitons in crystals such as set forth by in "Optical Properties of Solids", Abels, F., American Elsevier, New York, 1972 which is incorporated herewith in toto for providing a description of the theoretical background for selection of heavy inorganic scintillators. This theory is utilized in the selection of $BaCl_2$ in doped ZnO such as ZnO (Ga).

Thin films deposited on the plastic substrates is useful in the present invention may be made from ultra pure powders of $BaCl_2$, ZnO and their dopants available from Aldrich Chemical Company of Milwaukee, Wis. These powders are mixed and cold pressed into small pellets suitable for resistance sputtering or electron beam deposition at a pressure of about 180,000 psi. Each film utilized in the present invention required five pellets for the electron beam method. The pellets having a diameter of 18 mm and a thickness of 1.25 mm.

Following the deposition of the $BaCl_2$ and ZnO (Ga) on deposited substrate barium halide pellets were baked in a vacuum at about 300° centigrade for four hours prior to electron beam evaporation to remove residual water or hydration and all plastic substrates were cleaned with conventional techniques before deposition.

Further, the plastic substrate in their frames were heated to 80° centigrade for two hours to remove residual water prior to deposition. The deposition utilized an electron beam gun, optical and thickness monitors, a vacuum system capable of <10$^{-5}$ torr as well as a blow bar and power supply, all conventional equipment. The deposition was made of the pressure of <2×10$^{-5}$ torr. Some of the films were over coated with a silicon oxide layer after the barium halide deposition in order to prevent a crystal hydration. After exposure of the film in the substrate for one hour, it was found that the silicon oxide coating did not delay the hydration.

Figure 11:
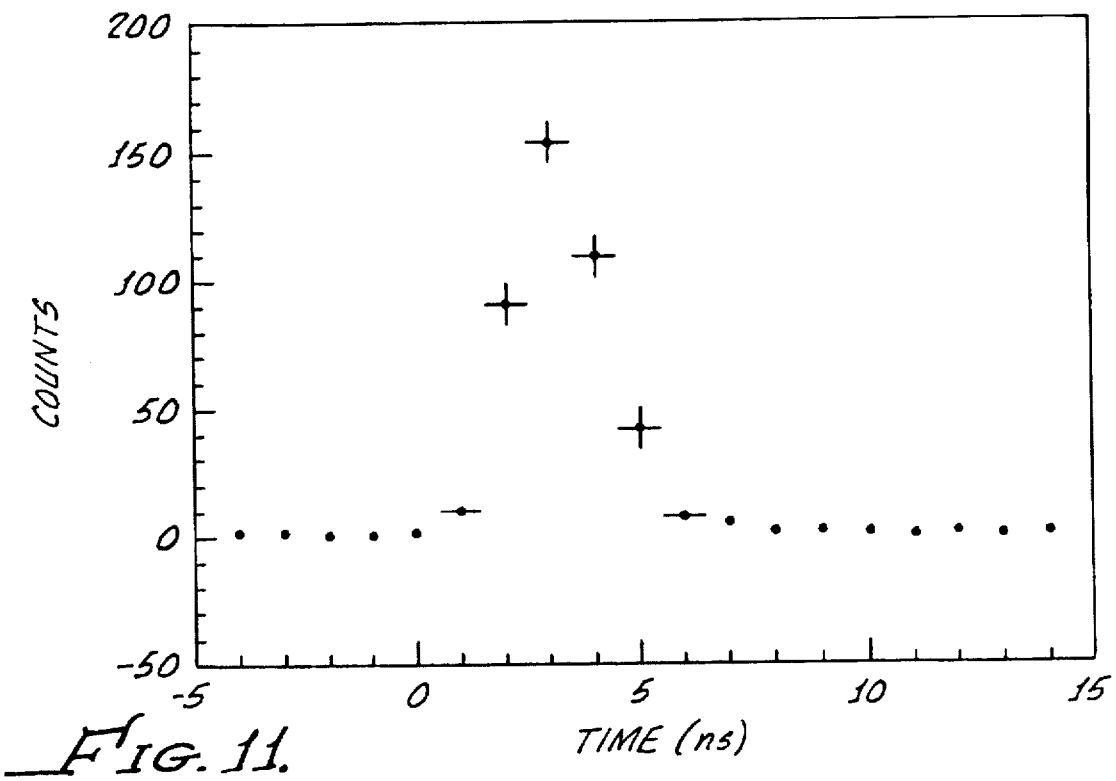
FIG. 11 is a plot of the time delay spectrum of ZnO(Ga, Si,H) powder on a nanosecond time scale (one nanosecond time bins)
Figure 12:
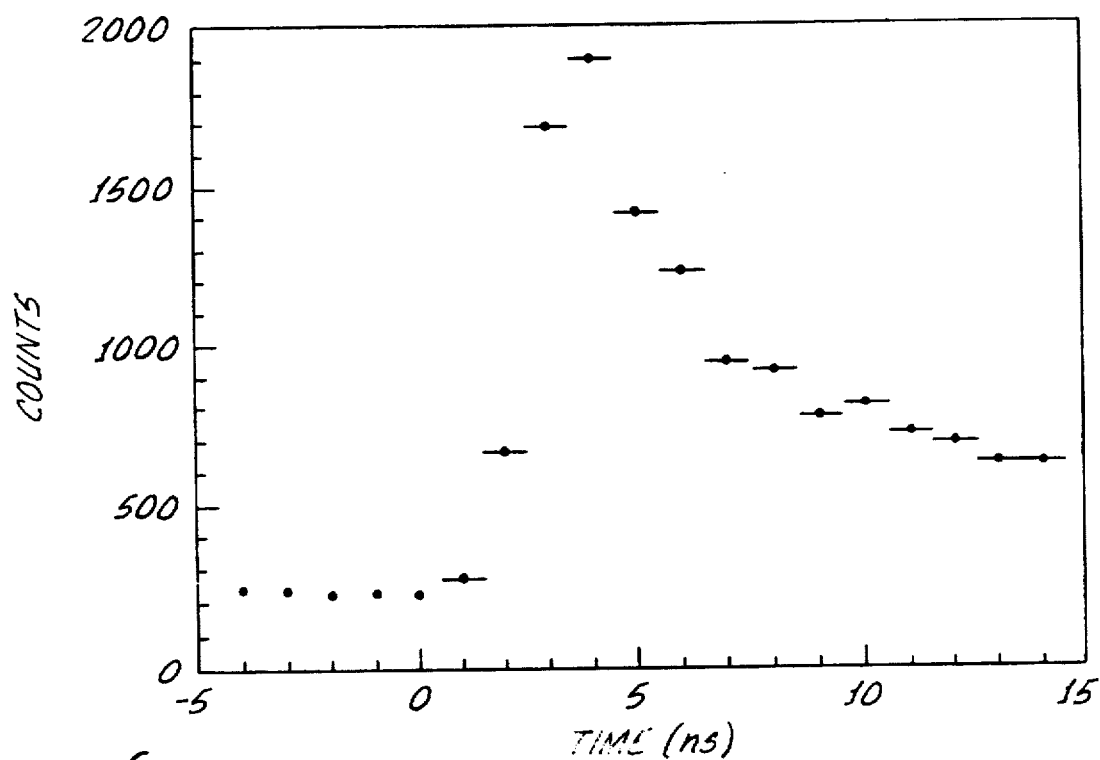
FIG. 12 is a plot of the time delay spectrum of a one micron $BaCl_2$ film on a nanosecond time scale.

FIG. 11 shows the time delay of the scintillation of the ZnO (Ga) phosphor powder at one nanosecond time and resolution. This powder has an effective transmission thickness of 30 microns and has a standard brightness of 15 photons/KeV. FIG. 12 shows a time delay of illuminiscence of a micron thick BaCl$_2$ film in accordance with the present invention. As can be seen in the brightness and speed of the two scintillators are comparable. The procedures described hereinabove produced the first optical clear BaCl$_2$ and ZnO films suitable for scintillators.

The comparison between FIGS. 11 and 12 demonstrate that a dry, clear and uniform crystal film of BaCl$_2$ fluoresces with about the same time decay rate in brightness as the hydrated BaCl$_2$ powder. In addition, the decay times and brightness are suitable for use in the present invention for making time of flight measurements.

The scintillator detector apparatus in accordance with the present invention has many applications. For example, in oil well logging and mineral exploration there is a need for a fast thin film scintillator to detect alpha particles for precision timing of D(T, alpha)n events for neutron source for ranging instrumentation. Argon National Laboratory has developed a novel way to measure the range between neutron source and target. In this method, the timing of the alpha emitted by each D(T) fusion event is recorded by a scintillator and photomultiplier (PMT). The pulse post alpha scintillator/PMT starts the time/amplitude correlator (TAC) of the instrument and the reception of a gamma ray from the neutron/target interception stops the TAC. Currently, no alpha Scintillator decay speed meets the TAC stop/start accuracy measurements. Such neutron target ranging provides three dimensional isotopic maps for oil well logging as well as for detecting some trace minerals. The scintillator detector in accordance with the present invention meets this need.

Inexpensive scintillators such as provided by the present invention provide for improved medical x-ray detection applications.

Further inexpensive detectors made in accordance with the present invention enable a greater access to students and researchers and further again provide inexpensive scintillators for safety applications.

Endless applications of the scintillator in accordance with the present invention may be found in the chemical arts and the electronic industries.

Although there has been hereinabove described an scintillator apparatus in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A scintillator detector apparatus comprising:
   fiber means, having individual fibers disposed in an open grid pattern, for detecting one form of radiation while enabling another form of radiation to pass through open portions of the grid pattern; and
   thin film means for generating scintillation upon intercepting the another form of radiation, said thin film means being deposited on a plastic substrate disposed proximate said fiber means on one side thereof.

2. The apparatus according to claim 1 wherein said fiber means comprises individual fibers disposed in a crossed pattern.

3. The apparatus according to claim 1 wherein said thin film means comprises scintillator material means for emitting scintillation upon intercepting the another form of radiation.

4. The apparatus according to claim 3 further comprises reflecting layer means, disposed on said plastic substrate, for directing scintillation from said thin film means into said fiber means.

5. The apparatus according to claim 1 wherein said fiber means comprises individual fibers having a thickness enabling beta particles of a selected energy to pass therethrough.

6. The apparatus according to claim 5 wherein said plastic substrate and deposited thin film means have a thickness enabling alpha particles of a selected energy to pass therethrough.

7. The apparatus according to claim 4 further comprising aluminumized plastic film means, disposed proximate another side of said fiber means, for directing, the scintillation from said thin film means into said fiber means.

8. The apparatus according to claim 7 wherein the scintillation generated by said thin film means comprises ultraviolet light and said fiber means is operative for generating first scintillation upon intercepting beta particles and second scintillation upon intercepting ultraviolet light generated by said thin film means.

9. A scintillation detector apparatus comprising:
   thin film means for generating ultraviolet light upon interception of alpha particles, said thin film means being deposited on a plastic substrate;
   frame means for supporting said plastic substrate; and
   fiber means, having individual fibers disposed on said thin film means in an open grid pattern, for detecting beta particles and ultraviolet light striking individual fibers and for enabling alpha particles to pass between said individual fibers.

10. The apparatus according to claim 9 wherein said individual fibers are deposited in an intersecting grid pattern.

11. The apparatus according to claim 9 wherein said individual fibers are disposed in a parallel relationship with one another.

12. The apparatus according to claim 9 wherein said plastic substrate comprises reflecting layer means, for directing ultraviolet light, generated by said thin film means, into said fiber means, said plastic substrate being disposed proximate one side of said fiber means.

13. The apparatus according to claim 12 further comprising aluminumized plastic film means, disposed proximate another side of said fiber means for directing the ultraviolet light from said thin film means into said fiber means.

14. A scintillator detector comprising:
   fiber means, having individual fibers, disposed in an open array, for generating scintillation upon intercepting one form of radiation while enabling another form of radiation to pass between said individual fibers;
   thin film means for generating scintillation upon intercepting another form of radiation, said thin film means being disposed on a plastic substrate;

frame means for supporting said plastic substrate;

photomultiplier means, connected to said individual fibers, for receiving the scintillation generated by said fiber means; and reflecting means, disposed on said plastic substrate, for directing the scintillation from said thin film means into said fiber means in order to create further scintillation therein.

15. The scintillation detector according to claim 14 wherein said individual fibers are disposed in an intersecting grid pattern.

16. The scintillation detector according to claim 14 wherein said individual fibers are disposed in a parallel relationship with one another.

17. The scintillation detector according to claim 14 wherein said fiber means comprises individual fibers having a thickness enabling beta radiation of a selected energy to pass therethrough after interception thereof.

18. The scintillation detector according to claim 17 wherein said plastic substrate and deposited thin film means have a thickness enabling alpha radiation of a selected energy to pass therethrough after interception thereof.

19. The scintillation detector according to claim 18 further comprising scintillator means for generating scintillation upon interception of alpha radiation passing through said thin film means and between said individual fibers and beta radiation passing through said fiber means, said scintillator means having sufficient thickness to stop both the alpha and beta radiation, and second photomultiplier means for receiving scintillation generated by said scintillator means.

20. The scintillator detector according to claim 19 wherein said second photomultiplier means is disposed at a distance from said fiber means and said thin film means and wherein said thin film means comprises scintillation material having a scintillation generation/decay time faster than a time necessary for said alpha particles to traverse the distance between the second photomultiplier and said fiber means and said thin film means.

21. The scintillator detector according to claim 20 wherein said scintillation material comprises $BaCl_2$.

22. The scintillator detector according to claim 20 wherein said scintillation material comprises doped ZnO.

23. Time of flight scintillator detector apparatus comprising:

first thin film means for generating ultraviolet light upon interception of alpha particles, said first thin film means being deposited on a first plastic substrate;

first frame means for supporting said first plastic substrate;

first fiber means having individual fibers disposed on said first thin film means in an open grid pattern for detecting beta particles and ultraviolet light striking an individual fiber and for enabling alpha particles to pass between said individual fibers;

second thin film means for generating ultraviolet light upon interception of alpha particles, said second thin film means being deposited on a second plastic substrate;

second frame means, disposed in a spaced apart relationship with said first frame means, for supporting said second plastic substrate; and second fiber means, having individual fibers disposed on said second thin film means in an open grid pattern, for detecting beta particles and ultraviolet light striking an individual fiber and for enabling alpha particles to pass between individual fibers.

24. The apparatus according to claim 23 further comprising first reflecting layer means for directing ultraviolet light, generated by said first thin film means, into said first fiber means, said first reflection layer means being disposed proximate one side of said first fiber means and second reflection layer means for directing ultraviolet light, generated by said second thin film means, into said second fiber means, said second reflecting layer means being disposed proximate one side of said second fiber means.

25. The apparatus according to claim 24 wherein said first fiber means comprise individual fibers having a thickness enabling beta particles of a selected energy to pass therethrough, and said second fiber means may comprise individual fibers having a thickness preventing beta particles of the selected energy to pass therethrough.

26. The apparatus according to claim 24 wherein said first thin film means and first plastic substrate have a thickness enabling alpha particles of a selected energy to pass therethrough and said second thin film means and second plastic substrate have a thickness preventing alpha particles of selected energy to pass therethrough.

27. The apparatus according to claim 26 further comprises first photomultiplier means, connected to said first fiber means, for generating electrical outputs corresponding to scintillation from individual fibers generated by beta particles and ultraviolet light and second photomultiplier means, connected to said second fiber means, for generating electrical outputs corresponding to scintillation from individual fibers generated by beta particles and ultraviolet light.

28. The apparatus according to claim 27 wherein said first thin film means comprises a scintillating material having a scintillator generating/decay time faster than a time necessary for said alpha particles to traverse a distance between the first thin film means and the second thin film means.

* * * * *